United States Patent [19]
Cooley

[11] 3,855,545
[45] Dec. 17, 1974

[54] LASER GLASS HOST COMPOSITIONS COMPRISING $TeO_2$, BAO, $LI_2O$
[75] Inventor: Richard F. Cooley, Toledo, Ohio
[73] Assignee: Owens-Illinois, Inc., Toledo, Ohio
[22] Filed: June 27, 1973
[21] Appl. No.: 373,922

[52] U.S. Cl. ..... 331/94.5 E, 252/301.4 R, 106/47 Q
[51] Int. Cl. ........ H01s 3/00, C03c 3/12, C03c 3/30
[58] Field of Search ....................... 106/47 D, 47 R; 331/94.5 E; 252/301.4 R, 301.4 F, 301.6 R

[56] References Cited
UNITED STATES PATENTS
3,423,326  1/1969  Redman .................. 252/301.6 R FOREIGN PATENTS OR APPLICATIONS
736,073    8/1955   Great Britain ................. 106/47 Q
741,986   12/1955   Great Britain ................. 106/47 Q
1,496,561  9/1972   Germany ...................... 106/47 Q OTHER PUBLICATIONS
Stanworth, "Tellurite Glasses," J. Soc. Glass Tech., Vol. 36, (1952), pp. 217–241, TP845S678.

Primary Examiner—Winston A. Douglas
Assistant Examiner—Mark Bell
Attorney, Agent, or Firm—Richard D. Heberling; E. J. Holler

[57] ABSTRACT

Laser glass host compositions for effective lasing amounts of $Nd_2O_3$ are disclosed, the host compositions comprising $TeO_2$, BaO and $Li_2O$ in certain molar amounts. Methods of making highly effective laser articles, including laser rods, also are disclosed. The new use of the above-described $TeO_2/BaO/Li_2O$ glass compositions for forming laser articles, are disclosed, the new use including forming laser articles from glasses, pumping the laser articles to provide an energy inversion, and lasing the pumped articles.

10 Claims, 1 Drawing Figure

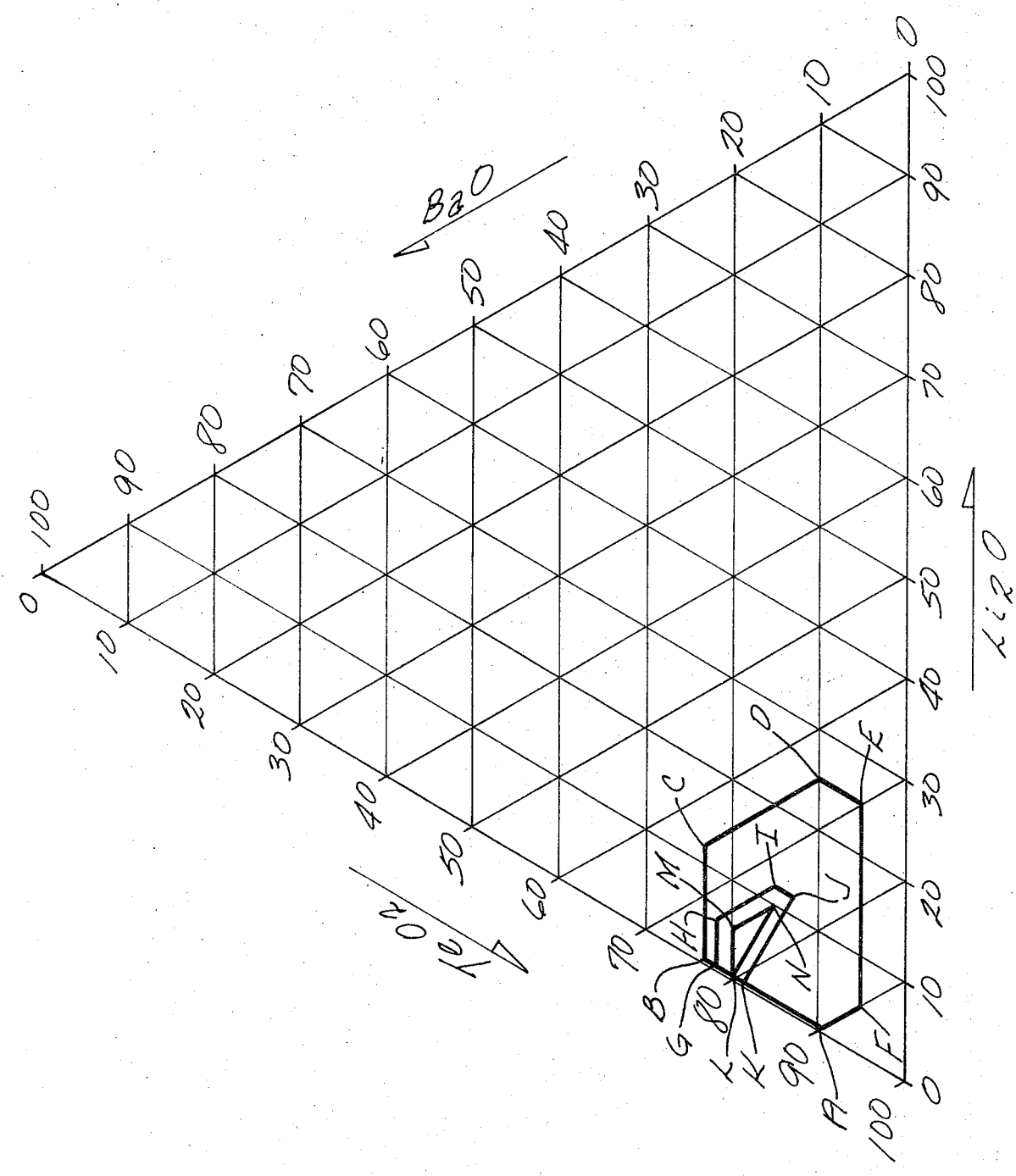

LASER GLASS HOST COMPOSITIONS COMPRISING TEO , BAO, LI O

INVENTION

The present invention relates to glass host compositions for efficient laser articles, the host compositions comprising $TeO_2$, BaO and $Li_2O$ in certain molar amounts and containing effective lasting amounts of $Nd_2O_3$. The present invention also relates to methods of making laser articles with increased efficiency, the methods including melting laser glass batch-forming materials to provide a molten $TeO_2/BaO/Li_2O$ glass containing an effective lasing amount of $Nd_2O_3$; forming a glass laser blank from the molten glass; and fabricating a glass laser article from the blank.

The present invention also relates to the new use for $TeO_2/BaO/Li_2O$ glass compositions for laser articles, the new use including forming the laser articles from the glass compositions that also contain an effective lasing amount of $Nd_2O_3$; pumping the laser article; and lasing the pumped article.

It is desirable to provide laser glass compositions that can be used to make outstanding, highly efficient glass laser articles. It is also desirable to provide novel methods for making the same and to provide the new use for glass compositions of $TeO_2$, BaO and $Li_2O$ in which the new use includes the steps of:

1. forming a glass laser article from the glass composition that is a host for an effective lasing amount of $Nd_2O_3$;
2. pumping the laser article; and
3. lasing the pumped article.

It is an object of the present invention to provide a laser glass composition containing $TeO_2$, BaO and $Li_2O$ in which the molar proportions thereof are defined by the area within the heavy lines connecting the points ABCDEF of the ternary diagram of the FIGURE of the drawings, the glass composition being a host for an effective lasing amount of $Nd_2O_3$.

It is an object of the present invention to provide a method for making a glass article, such as a laser rod, in which the method comprises the steps of:

1. melting laser glass batch-forming materials to provide a molten glass comprising $TeO_2$, BaO and $Li_2O$ in which the molar proportions thereof are defined by the area within the heavy lines connecting the points ABCDEF of the ternary diagram, the molten glass being a host for an effective lasing amount of $Nd_2O_3$;
2. forming a glass laser blank from the molten glass; and
3. fabricating a laser article from the blank to provide a very efficient laser article.

It is an object of the present invention to provide the new use for a glass composition as a glass laser article in which the glass contains certain molar proportions of $TeO_2$, BaO and $Li_2O$ that are defined in a general range by the area within the heavy lines connecting points ABCDEF of the ternary diagram, and in which the glass composition is a host for an effective lasing amount of $Nd_2O_3$, the new use comprising the steps of:

1. forming a glass laser article from the glass composition comprising $TeO_2$, BaO and $Li_2O$;
2. pumping the laser article to provide an energy inversion; and
3. lasing the pumped laser article.

It is an object of the present invention to provide highly efficient glass laser articles, such as rods or discs, made from a glass composition comprising certain molar amounts of $TeO_2$, BaO and $Li_2O$, the composition being a host for an effective lasing amount of $Nd_2O_3$.

These and other objects will become apparent from the specification that follows, the appended claims, and the drawings, in which the FIGURE is a ternary diagram of the glass host composition of the present invention, in which the molar proportions of $TeO_2$, BaO and $Li_2O$ are defined in general, preferred and optimum ranges by the areas within the heavy lines of the ternary diagram.

The present invention provides outstanding laser glass host compositions for effective amounts of $Nd_2O_3$, the host compositions comprising $TeO_2$, BaO and $Li_2O$ in certain molar proportions thereof that are defined in a general range by the area within the heavy lines connecting the points ABCDEF of the ternary diagram of the FIGURE of the drawing. Preferably, the molar proportions of $TeO_2$, BaO and $Li_2O$ are defined by the area within the heavy lines connecting the points GHIJK of the ternary diagram. The optimum range for the laser glass host compositions of the present invention are defined by the area within the heavy lines connecting the points LMN of the ternary diagram.

The present invention also provides glass laser articles and methods for making the articles, the methods including the steps of:

1. melting laser glass batch-forming materials to provide a molten glass comprising $TeO_2$, BaO and $Li_2O$ in which the molar proportions thereof are defined in a general range by the area within the heavy lines connecting the points ABCDEF of the ternary diagram, the molten glass capable of acting as a host for an effective lasing amount of $Nd_2O_3$;
2. forming a glass laser blank from the molten glass; and
3. fabricating the outstanding laser articles from the laser blank.

The present invention also provides the new use for a glass composition as a glass laser article in which the glass composition comprises $TeO_2$, BaO and $Li_2O$ in certain molar proportions that are defined in a general range within the area formed by the heavy lines connecting the points ABCDEF of the ternary diagram, in which the glass composition is a host for an effective lasing amount of $Nd_2O_3$, the new use comprising the steps of:

1. forming a glass laser article from the glass composition comprising $TeO_2$, BaO and $Li_2O$;
2. pumping the laser article to provide an energy inversion; and
3. passing monochromatic light through the article to provide a stimulated emission at a wavelength of about 1.06 microns.

A zinc tellurite glass consisting essentially of a major molar proportion of $TeO_2$ and between about 20 and 40 molar percent of ZnO is described and claimed in the Redman U.S. Pat. No. 3,423,326. These zinc tellurite glasses were reported as having some fluorescent activity when doped with $Nd_2O_3$.

As previously indicated, the outstanding laser glass host compositions of the present invention unexpectedly provide much higher fluorescent activity than the zinc tellurite glasses of the Redman U.S. Pat. NO.

3,423,326, the increased fluorescent activity indicating a greater lasing efficiency for laser articles made from the host compositions of the present invention. As previously described, only certain molar proportions of $TeO_2$, BaO and $Li_2O$ can be used to provide highly efficient laser articles, including rods and discs. The increase in fluorescent activity, when compared to the working examples of U.S. Pat. No. 3,423,326, is generally at least 100 percent or more. The increase in fluorescent activity compared to the glasses of U.S. Pat. No. 3,423,326, disclosed but not in a working example, is generally at least about 50 percent and preferably at least about 60 or 70 percent.

In the previously mentioned Redman patent, there is no mention of any glass system other than that of a glass host composition consisting essentially of tellurium oxide and zinc oxide. There is no mention in the Redman patent of highly efficient laser articles that can be made from a host composition containing certain molar proportions of $TeO_2$, BaO and $Li_2O$.

In general, the laser host compositions of the present invention contain about 65–90 mole percent $TeO_2$, about 5–23 mole percent BaO, and about 0.2–25 mole percent $Li_2O$.

Preferably, the laser glass host compositions comprise about 75–81 mole percent $TeO_2$, about 13–22 mole percent BaO, and about 0.2–12 mole percent $Li_2O$.

The optimum laser glass host compositions of the present invention comprise about 75–80 mole percent $TeO_2$, about 15–20 mole percent BaO, and about 0.2–10 mole percent $Li_2O$.

Good results have been obtained with a glass laser composition comprising about 75 mole percent $TeO_2$, about 10 mole percent $Li_2O$, and about 15 mole percent BaO; or about 80 mole percent $TeO_2$, about 19.8 mole percent BaO, and about 0.2 mole percent $Li_2O$; or about 75 mole percent $TeO_2$, about 20 mole percent BaO, and about 5 mole percent $Li_2O$.

In accordance with the present invention, the increase in fluorescent activity for laser articles of the present invention is surprisingly at least about 50 percent over that of a zinc tellurite glass containing 65 mole percent $TeO_2$ and 35 mole percent ZnO.

As indicated, the laser glass host compositions contain an effective lasing amount of $Nd_2O_3$, which is generally about 0.01–1.5 mole percent, preferably about 0.3–1.0 mole percent, and optimally about 0.4–0.6 mole percent $Nd_2O_3$.

The increase in fluorescent activity unexpectedly is at least about 50 percent greater than that of a lithia-calcia-alumino silicate glass laser rod, as set forth in U.S. Pat. No. 3,471,409, to Lee and Rapp, the laser composition containing the following ingredients in approximate mole percentages:

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

The highest fluorescent intensity value for a zinc tellurite glass containing 65 mole percent $TeO_2$ and 35 mole percent ZnO is about 2.09 when compared to the fluorescent intensity value of the above-described lithia-calcia-alumino silicate glass laser, which is the reference glass, arbitrarily designated or held to be 1.0. The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent Host Glass | Mole Percent Laser Article | Weight Percent Host Glass | Weight Percent Laser Article |
|---|---|---|---|---|
| $TeO_2$ | 85.0 | 85.0 | 89.5 | 88.0 |
| BaO | 10.0 | 9.5 | 9.6 | 9.4 |
| $Li_2O$ | 5.0 | 4.7 | 0.9 | 0.9 |
| $Nd_2O_3$ | — | 0.8 | — | 1.7 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.07.

PART B

The polished glass disc from Part A was tested for fluorescence intensity and decay time in a high power pulsed test system. The disc was placed in a holder and exposed to a beam of light from an EG & G model FX 12-25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 3.03 when normalized against the glass laser composition; 3.03 times the intensity of the glass laser composition.

The fluorescence intensity was corrected for the refractive indices of the glass disc and the reference glass laser composition by FI (corrected) = FI (normalized) $[(1.56)^2/(\eta\text{glass disc})^2]$ The corrected fluorescence intensity was 1.67. The fluorescence decay time was 158 microseconds.

EXAMPLE 2
PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.5 | 78.9 | 77.6 |
| BaO | 20.0 | 19.8 | 20.1 | 19.8 |
| $Li_2O$ | 5.0 | 4.9 | 1.0 | 0.9 |
| $Nd_2O_3$ | — | 0.8 | — | 1.7 |

The refractive index of the finished polished glass disc was measured to be 2.03.

PART B

The polished glass disc from Part A was tested for fluorescence intensity and decay time as described in Part B of Example 1. The normalized fluorescence intensity was 3.30 and the corrected fluorescence intensity was 1.89. The fluorescence decay time was 161 microseconds.

EXAMPLE 3
PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 80.0 | 79.5 | 84.0 | 82.5 |
| BaO | 15.0 | 14.8 | 15.1 | 14.8 |
| $Li_2O$ | 5.0 | 4.9 | 0.9 | 0.9 |
| $Nd_2O_3$ | — | 0.8 | — | 1.7 |

The refractive index of the finished polished glass disc was measured to be 2.08.

PART B

The polished glass disc from Part A was tested for fluorescence intensity and decay time as described in Part B of Example 1. The normalized fluorescence intensity was 2.80 and the corrected fluorescence intensity was 1.55. The fluorescence decay time was 156 microseconds.

EXAMPLE 4
PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.5 | 85.9 | 84.3 |
| BaO | 10.0 | 9.9 | 10.4 | 10.8 |
| $Li_2O$ | 15.0 | 14.8 | 3.2 | 3.1 |
| $Nd_2O_3$ | — | 0.7 | — | 1.7 |

The refractive index of the finished polished glass disc was measured to be 2.05.

PART B

The polished glass disc from Part A was tested for fluorescence intensity and decay time as described in Part B of Example 1. The normalized fluorescence intensity was 3.40 and the corrected fluorescence intensity was 1.91. The fluorescence decay time was 160 microseconds.

Other specific glass laser compositions set forth herein as being suitable for use in the present invention can be substituted for the specific glass laser compositions used in the working examples to provide substantially equivalent results. For instance, any of the compositions set forth within the area formed by the heavy lines connecting the points ABCDEF of the ternary diagram can be used in place of the specific laser compositions used in the working examples to provide an increased efficiency of at least about 50 percent over that of a zinc tellurite glass of the Redman patent, as previously described. An increase in efficiency generally is obtained of at least 50 percent and preferably 60 to 70 percent or more by glass host compositions within the area formed by the heavy lines connecting the points GHIJK or the optimum ranges within the area formed by the heavy lines connecting the points LMN of the ternary diagram. The increase in efficiency is as high as about 100 percent or more in the preferred range and general range, particularly when compared to the working examples of the Redman U.S. Pat. No. 3,423,326.

What is claimed is:

1. A laser glass host composition comprising $TeO_2$, BaO and $Li_2O$ in which the proportions in molar amounts of $TeO_2$, BaO and $Li_2O$ are defined by the areas within the heavy lines connecting the points ABCDEF of the ternary diagram of the FIGURE of the drawings, the laser glass composition being a host for an effective lasing amount of $Nd_2O_3$.

2. A laser glass host composition as defined in claim 1 in which the proportions of $TeO_2$, BaO and $Li_2O$ are defined by the area within the heavy lines connecting the points GHIJK of the ternary diagram of the FIGURE of the drawings.

3. A laser glass host composition as defined in claim 1 in which the proportions of $TeO_2$, BaO and $Li_2O$ are defined by the area within the heavy lines connecting the points LMN of the ternary diagram of the FIGURE of the drawings.

4. A laser glass host composition comprising about 75–81 mole percent $TeO_2$, about 13–22 mole percent BaO, and about 0.2–12 mole percent $Li_2O$.

5. A laser glass composition comprising:
1. a host glass containing about 65–90 mole percent $TeO_2$, about 5–23 mole percent BaO, and about 0.2 to 25 mole percent $Li_2O$; and
2. an effective lasing amount of $Nd_2O_3$.

6. A laser glass composition comprising about 75–80 mole percent $TeO_2$, about 15–20 mole percent BaO and about 0.2–10 mole percent $Li_2O$, and about 0.01–1.5 mole percent $Nd_2O_3$.

7. A laser glass composition as defined in claim 5 in which the host glass comprises about 75 mole percent $TeO_2$, about 10 mole percent $Li_2O$, and about 15 mole percent BaO.

8. A laser glass composition as defined in claim 5 in which the glass host comprises about 80.0 mole percent $TeO_2$, about 19.8 mole percent BaO, and about 0.2 mole percent $Li_2O$.

9. A composition as defined in claim 5 in which glass host comprises about 75 mole percent $TeO_2$, about 20 mole percent BaO and about 5 mole percent $Li_2O$.

10. The new use for a glass composition as a glass laser article in which the composition comprises $TeO_2$, BaO and $Li_2O$ and the molar proportions thereof are defined by the areas within the heavy lines connecting the points ABCDEF in the ternary diagram of the FIGURE of the drawings, and which glass composition is a host for an effective lasing amount of $Nd_2O_3$, the new use comprising the steps of:
1. forming the glass laser article from the glass composition;
2. pumping the laser article to provide an energy inversion; and
3. lasing the pumped laser article.

* * * * *